March 26, 1929.  C. P. JAEGER  1,706,612
COOKING APPARATUS
Filed April 2, 1928   2 Sheets-Sheet 1
Fig: 1
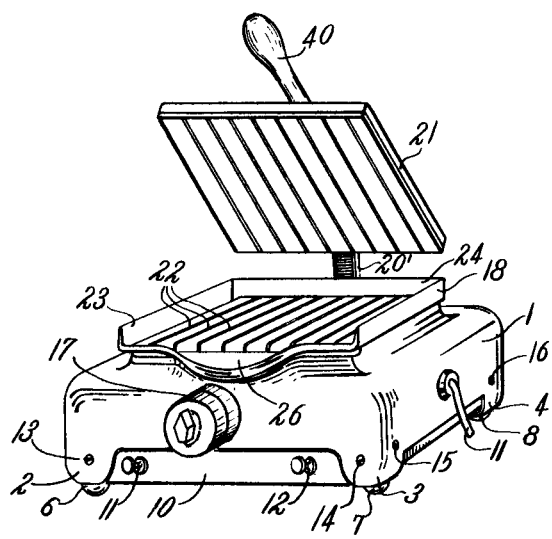
Fig: 2
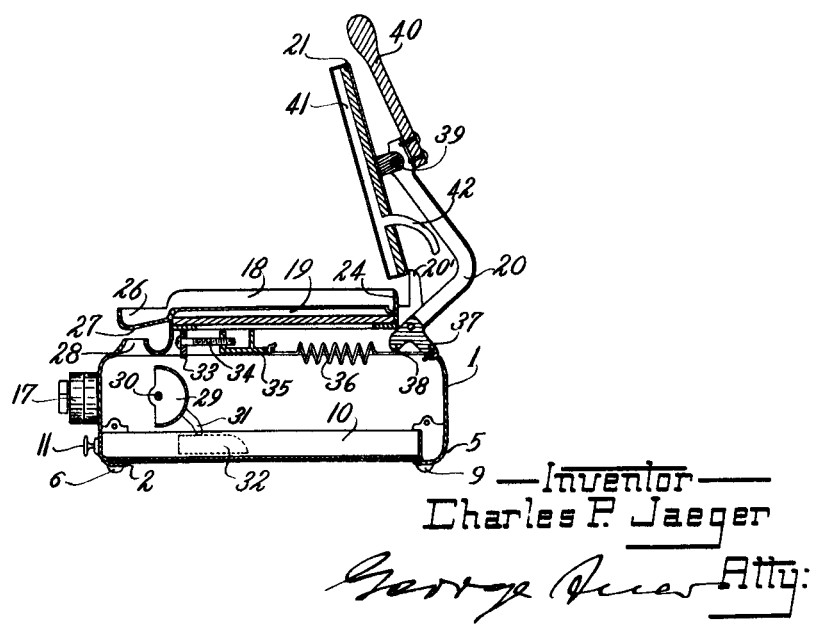
Inventor
Charles P. Jaeger March 26, 1929.  C. P. JAEGER  1,706,612
COOKING APPARATUS
Filed April 2, 1928  2 Sheets-Sheet 2
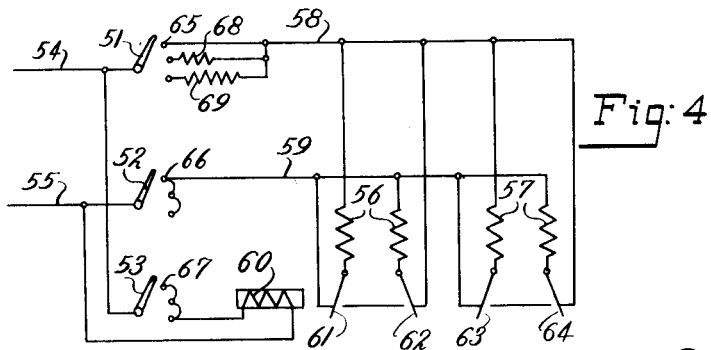
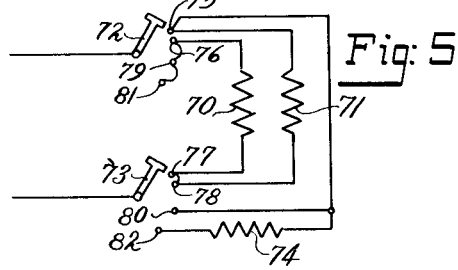
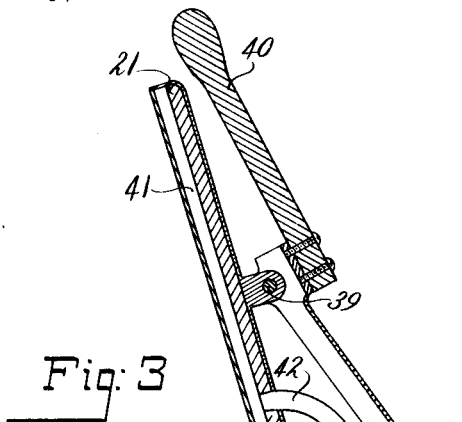
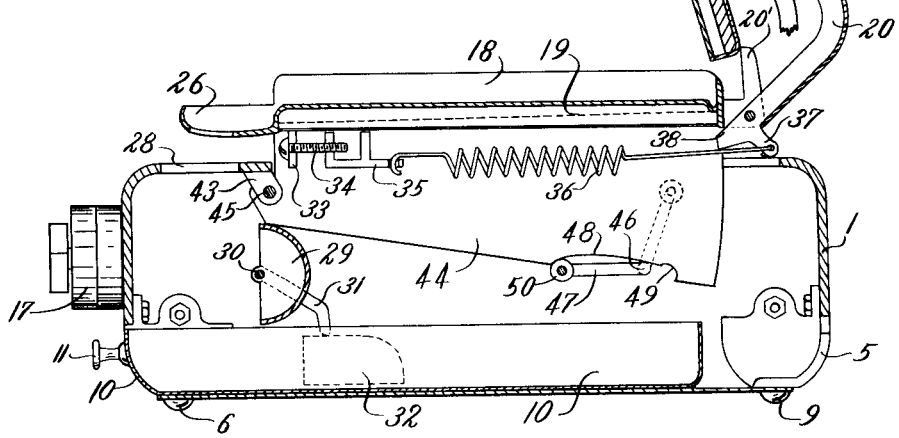
Inventor
Charles P. Jaeger
George Auer Atty.

Patented Mar. 26, 1929.

1,706,612

UNITED STATES PATENT OFFICE.

CHARLES P. JAEGER, OF CHICAGO, ILLINOIS.

COOKING APPARATUS.

Application filed April 2, 1928. Serial No. 266,643.

This invention relates to an electrical cooking apparatus, and is more particularly concerned with a novel and improved device for broiling or frying meat and other articles of food in a convenient and effective manner.

The invention may be considered an improvement over the device shown in my copending application Serial No. 255,074, filed February 17, 1928, which is a division of my application Serial No. 34,842, filed June 4, 1925. In said divisional application is shown and claimed a device for toasting sandwiches between electrically heated plates.

An object of the present invention is to provide an apparatus for broiling meat in which heat may be applied to two movable cooking plates between which the meat is placed. Another object is to provide means for draining off the grease and the juices during broiling. Still another object has to do with the provisions for gathering the drained grease and juices in a removable drip-pan and with the provision of an auxiliary drip-pan which positions itself automatically to catch grease and juices when the first drip-pan is removed during the time the apparatus is in use. A further object resides in means for changing the position of the cooking plate from a horizontal normal position to an inclined position which may be useful for special cooking operations. And another object has to do with the circuit provisions for speedily heating the cooking plates to a desired degree when the apparatus is initially connected to current and for changing the circuit connections afterwards in a convenient manner to maintain only a degree of heat necessary for effectively finishing or continuing the cooking operation.

The full objects and advantages of the invention will appear in connection with the detailed description which is yet to follow, and the novel features of the invention will be particularly pointed out in the claims.

The invention, or rather certain forms of carrying the invention into effect, are illustrated in the accompanying two sheets of drawings, in which,—

Fig. 1 shows a perspective view of the apparatus;

Fig. 2, a cross section of the device shown in Fig. 1;

Fig. 3 illustrates a cross section of a modified form in which the position of the cooking plates can be changed from horizontal to an inclined position; and Figs. 4 and 5 show circuit diagrams for effectively wiring the apparatus as intimated above.

The various parts of the device are numbered alike throughout the drawings, and a certain figure will, therefore, be referred to only if it is necessary for explaining a detail. The circuit diagrams shown in Figs. 4 and 5 are in conformance to usual conventional schematic representation, and will be described separately as to function and meaning of the various symbols used.

Referring now to the drawings shown in Figs. 1 and 2, it will be seen that the apparatus comprises a base 1, provided with legs 2 to 5, inclusive, which in turn are provided with feet 6 to 9, inclusive, made of suitable material, such as rubber for example. In the lower portion of the base and removable therefrom is a drip-pan 10 which has two handles 11 and 12. The legs may be fastened to the base by means of rivets or screws as indicated at 13 to 16 in Fig. 1, or the legs may be integral with the base, cast of one piece if desired. In front of the base is mounted a snap switch 17. This switch will not be described in detail because the same is well known and widely used for a great variety of purposes. It may be remarked, however, that this switch as used in the present invention is a three position switch and marked in the usual way for readily positioning the same to "high"— "medium"—and to "low" heat. The circuit connections used will be described presently. The upper part of the base is provided with a cooking plate which is mounted horizontally. This cooking plate is designated by numeral 18.

Inside of the cooking plate 18 is an electrical heating element of suitable design which is not shown and explained in order to avoid unnecessarily encumbering the specification. Such heating elements are well known, and any approved design may be used in connection with the present invention provided it furnishes the desired degree of heat. The position of the heating element in the cooking plate is indicated by reference numeral 19. On the back part of the cooking plate are provided two projecting arms for rotatably mounting the operating lever 20 which holds the companion cooking plate 21. One of these projecting arms is clearly visible in the Fig. 2, and is designated by reference numeral 20.

The cooking plate 18 is provided with projecting ribs such as 22, which serve for holding an article placed on the plate, in place, and with ledges projecting from three sides, designated 23 to 25, inclusive, for preventing the overflow of grease, or rather to say for confining the grease and the juices on the plate. These ledges project from the cooking plate in such a manner that a trough is formed around the entire plate. In other words, the cooking plate projects upwardly from this peripheral trough. The front section of the cooking plate ends in a trough-like portion 26 which is provided with an opening 27. It will be apparent that grease and juices produced during the cooking operation will readily collect on the lower cooking plate due to the peripheral trough formed by the ledges and will finally collect in the trough-like portion 26, and drain off through the opening 27. Beneath said opening 27 is an opening 28 in the base. Grease and juices will therefore drain off through these openings and collect in the drip-pan 10. Mounted slightly in back of the opening 28 is a rotatable auxiliary drip-pan 29. This auxiliary pan is mounted on a shaft 30 which extends transversely through the base 1 and is attached to the sides thereof. The auxiliary drip-pan is provided with an arm 31 adapted to ride on a guide piece 32 attached to one or to both sides of the drip pan 10. When the drip-pan 10 is inserted as shown in the drawing Fig. 2, it will be seen that the guide piece 32 has moved the auxiliary drip-pan into non-operative position. Should the drip-pan 10 be withdrawn in order to empty the same, the guide 32 will pass under the arm 31, and will finally release the auxiliary drip-pan which will swing automatically into operative position, locating itself exactly below the opening 28. Grease or juices draining off during the time the drip-pan 10 is withdrawn will therefore flow into the auxiliary drip-pan 29. When the pan 10 is inserted again, the guide 32 will operate the arm 31 in an obvious manner and the auxiliary pan will be rotated into the position shown and will empty into the drip-pan 10. The advantages of this arrangement are evident. Clean and economical operation will result which will readily be recognized as desirable. Attention may be directed to the automatic operation of the auxiliary drip-pan which obviates watching or special care to prevent soiling when the main drip-pan is withdrawn. It will be understood, of course, without elaborate explanation, that this automatic operation of the auxiliary drip-pan is achieved by suitably proportioning the weight of the same and of the arm 31, so that the pan has normally a tendency to position itself by gravity exactly underneath the opening 28.

Inside of the base and beneath the cooking plate 18 is mounted a bracket 33 with an opening for receiving a screw 34. This screw holds a second movable bracket 35 to which is attached one end of a coiled spring 36. The other end of this spring attaches to an extension 37 on the operating lever 20. Since this operating lever is rotatably mounted between the projections on the base, one of these projections being designated by numeral 20' it is apparent that the operating lever will be influenced by the tension of coiled spring 36 with the tendency to move upwards into the position shown in Fig. 2. An extension 38 on the operating arm 20 limits the movement of this arm, the extension 38 acting as a stop against the lower part of the cooking plate. The purpose of this arrangement is to balance the weight of the upper cooking plate which is mounted on operating lever 20 against the tension of coiled spring 36. There is nothing especially new in this balancing arrangement. The invention shown in the divisional application mentioned in an introductory paragraph of the instant specification describes a similar arrangement. New, however, is the particular arrangement for limiting the movement of the operating lever 20, that is to say, the projection 38 provided thereon which does not permit the operating lever to move beyond certain positive limits. It may be also mentioned at this point that the projections on the base which serve for rotatably mounting the operating lever, one being shown in Fig. 2 and designated by reference numeral 20', extend upward to provide a definite stop for the upper cooking plate 21, as shown in this Fig. 2, which is a very convenient arrangement and represents another feature over the device shown in said divisional application.

The companion cooking plate 21 is rotatably mounted on the operating lever 20 at 39, and a handle 40 is fastened to the operating lever as shown. This movable companion cooking plate is also provided with a heating element such as indicated at 41. Ribs are also provided on the outside of the upper cooking plate, corresponding to the ribs on the lower plate. When the two cooking plates are in operative position, these ribs overlap, that is to say, they are displaced with respect to each other so that a rib on the upper plate will be located between two ribs on the lower plate. An article of food placed between the two plates will be firmly held in place by this provision. The surfaces of the cooking plates are solid throughout. It will be understood, of course, that the ribs provided on the heating surfaces of the plates are shown merely for purposes of illustration. If not desired, they may be omitted entirely, leaving the heating surfaces perfectly plane. Due to the fact that the upper plate is mounted rotatably it will always position itself parallel to the lower plate, regardless of the thickness of the article of food placed between the two plates.

Reference numeral 42 designates a cable provided for receiving conductors leading to the heating element in the upper cooking plate. It will be understood that the cable is continued and also contains the conductors for the heating element in the lower cooking plate. The cable may be provided with a protecting armature, as shown. A coiled spring may be used for this purpose.

Referring now to Fig. 3, this figure shows a modification in which the lower cooking plate and with it the upper plate, may be moved to an inclined position if desired. Ordinarily, any conceivable cooking operation may be carried out on the device as shown in Figs. 1 and 2. However, it may be desirable for certain purposes, to position the cooking plates on an incline, and Fig. 3 shows means for doing it. Only those parts will be discussed in connection with Fig. 3 which differ from the structure explained previously.

The cooking plate which is stationary in the structure shown in Figs. 1 and 2, is, in the modification about to be explained, provided with extending portions such as the one designated by numeral 44. The base carries brackets such as 43, and the lower cooking plate is rotatably mounted on the base at 45 by means of these extensions and brackets. A shaft 46 is mounted transversely in the sides of base 1, having a U-shaped extension 47. Normally, the lower cooking plate rests on this shaft in the position shown. The extensions on the lower plate are also provided with notches 48 which terminate in larger circular notches such as 49. The U-shaped part of shaft 46 carries rollers such as 50, and the shaft extends to the outside of base 1 where it is provided with a crank. When it is desired to move the plates into an inclined position it is only necessary to operate the crank pin in a direction indicated by the arrow in Fig. 3, thereby moving the U-shaped portion of shaft 46 and forcing the rollers 50 to ride along the notches 48 on extensions 44, raising the cooking plates to an inclined position. The rollers will finally engage the notches 49 and the U-shaped portion of the shaft will at this moment be positioned as indicated in dotted lines, the weight of the cooking plates holding the shaft in operated position without any auxiliary locking means since the rollers are beyond the center line.

All other details in Fig. 3 correspond to those already explained in connection with the device shown in Figs. 1 and 2. Fig. 3 also shows the fastening of the legs to the base more clearly than the other figures.

Referring now to Fig. 4, there is shown a 3-pole, 3-position switch having switch arms 51 to 53, inclusive, which are normally connected to conductors 54 and 55 belonging to a cord which may terminate in a plug for attachment to a commercial current source. This cord is indicated in Fig. 1, by reference numeral 1', and the switch is indicated by reference numeral 7. It is assumed that each of the cooking plates is provided with two heating elements. Thus, the elements shown and designated 56 belong to one cooking plate, and the elements 57 to the other. Normally, it will be seen, all the elements are connected in parallel to the conductors 58 and 59 which terminate in the positions of the snap switch. A thermostatic device 60 is shown connected to the three positions accessible to switch arm 53 which in turn is connected to the supply conductor 54. The other terminal of the thermostatic device 60 is attached to supply conductor 55. The thermostatic device is adapted to actuate the armatures 61 to 64, inclusive, and it will be seen that this device will be connected to current regardless in which position the switch rests. A certain time after being connected, the thermostatic device will actuate and move its armatures into alternate position, changing the parallel connection of the heating elements into a series connection. The operation is as follows:

When the switch is actuated into position 1, the arms 51, 52 and 53 engage the terminals 65, 66 and 67, respectively. Obvious circuits are, therefore, established for the thermostatic device 60, and for the various heating elements in parallel. The cooking plates will be rapidly heated to a desired degree. At this moment, the thermostatic device will operate and switch the heating elements from a parallel circuit into a series circuit. The heating elements now maintain the degree of heat reached when connected in parallel and burning out of the elements or damage to the cooking plates is prevented. If medium heat is desired, the operator actuates the switch, thereby connecting the arms 51, 52 and 53 with the terminals of the second position. A resistance 68 is now connected in the circuit, reducing the current supply to the desired degree. If low heat is desired, the switch is actuated again, and the arms are advanced into engagement with the terminals of the third position, in which the resistance 69 is connected in the circuit to further reduce the current.

Fig. 5 illustrates a circuit utilizing a 2-pole, 3-position switch. The cooking plates are each provided with one heating element, designated by reference numerals 70 and 71. When the switch is operated into the first position, the arms 72 and 73 engage each two terminals, e. g., the terminals 75—76 and 77—78, respectively. The heating elements, as will readily be seen, are now connected in parallel developing sufficient power to heat the cooking plates quickly to the desired degree. In position 2 of the switch, the arms 72 and 73 engage the terminals 79 and 80. The elements are now connected in series, the heat is reduced to "medium". In position 3 of the switch, the arms engage the terminals 81 and 82, respectively, in which position the elements are again connected in series and in series with the resistance 74 which effects a further reduction of heat to "low".

It will be seen that both circuits shown are effective for the present purpose. The circuit explained in connection with Fig. 5 is particularly serviceable because of its simplicity. Usually, in devices specifying three degrees of heat for various reasons, two separate resistances are required. In case of the circuit last described, only one resistance is necessary, switching of the elements from parallel to a series circuit is utilized to effect one step in the required procedure. It may also be remarked that the circuits shown in Figs. 4 and 5 may be used for simultaneously operating a plurality of devices. In the first position, the heating elements of two separate devices may be connected in parallel, effecting a quick rise of temperature on the cooking plates; in the second position the elements of these two separate devices may be connected in series; and in the third position, a resistance may be included in the series circuit. Such central control may be desirable in cases when a number of devices are simultaneously used.

It may be remarked in conclusion, that the cooking plates may be heated uniformly or that they may be heated to different degrees, as desired. I have found that the apparatus works most efficiently by applying different heat to each cooking plate, and, accordingly, the respective heating elements must be chosen to furnish the required heat.

The device shown and described in the foregoing can, of course, be used for cooking a variety of foodstuff in a convenient and clean manner; it is not restricted in any way to the use explained. It will also be realized that modifications of structure may suggest themselves readily without departing from the spirit of the invention. Therefore, it is desired to be understood that I do not want to be limited in the application of the invention and in its structure, beyond and above the limitations expressed in the following claims.

What is claimed is:

1. An apparatus for broiling meat and the like, comprising a first cooking plate provided with a peripheral trough for collecting grease and juices, a second cooking plate, means for positioning said second cooking plate parallel to said first plate regardless of the size of the piece of meat inserted between said plates, a removable pan for receiving said grease and juices collected in said trough, an opening in said trough for conducting said grease and juices into said removable pan, an auxiliary pan, and means for positioning said auxiliary pan to receive said juices and grease by the removal of said first pan.

2. An apparatus for broiling meat and the like, comprising two cooking plates movable with respect to each other for inserting meat of variable size between said plates, a peripheral trough provided on one of said plates for collecting grease and juices produced during the broiling operation, a removable pan for receiving said grease, means in said trough for conducting said grease into said removable pan, and means caused to be moved into operative position by withdrawal of the pan for temporarily receiving said grease when said pan is removed.

3. An apparatus for broiling or frying meat and the like, comprising a pair of separable cooking plates, a peripheral trough provided on one of said plates for collecting grease produced during said broiling or frying operations, and a plurality of interchangeably used means for catching said grease the removal of one causing another to be operatively positioned.

4. An apparatus of the class described, comprising two cooperatively supported cooking plates, means comprising a lever and a pivotal connection between said lever and one of said plates for positioning said plate parallel to but separated from the other plate, and means for moving both plates simultaneously.

5. An apparatus for broiling or frying and the like, comprising a cooking plate having grease collecting and discharging means, a removable grease pan normally receiving the discharged grease, and a supplemental grease receiving member positioned by removal of the pan to receive the grease discharged from said plate.

6. In an apparatus for broiling or frying and the like, a supporting structure, a cooking plate pivotally mounted on said structure, a grease receptacle below the plate, and means for moving said plate on its pivotal axis into position inclined downwardly toward the receptacle, said plate having means for discharging the grease into said receptacle.

In witness whereof, I hereunto subscribe my name this 31st day of March, A. D., 1928.

CHARLES P. JAEGER.